United States Patent Office 2,970,118
Patented Jan. 31, 1961

2,970,118
CELLULAR POLYURETHANE RESIN AND PROCESS OF PREPARING SAME

Christopher L. Wilson, Sloatsburgh, and Henry George Hammon, Piermont, N.Y., assignors to Hudson Foam Plastics Corporation, Yonkers, N.Y., a corporation of New York No Drawing. Filed July 8, 1954, Ser. No. 442,196

7 Claims. (Cl. 260—2.5)

Polyester resins made by esterifying dibasic acids with polyhydric alcohols have attained widespread use in industry for such applications as coating compositions and the lamination of materials such as glass fibers and asbestos. For these uses the resin is preferred in a hard, tough, resilient form. The resin is first prepared as a liquid or as a thermoplastic solid which is then cured either by heating with an acid or cross-linked with the aid of vinyl groups in the ester and the presence of a peroxide catalyst. If this type of resin is expanded as it cures, the expanded material which results has considerable strength and is light in weight. Because of these properties, constructional materials made from these resins can be used for sound and heat insulation and in building aircraft laminates.

Another type of expanded polyester resinous material has been disclosed in the co-pending application of Christopher L. Wilson and Oscar Shuffman, Serial No. 420,744, filed April 2, 1954. This material is made by mixing a polyester resin, made by reacting a dibasic acid having more than one carbon atom between the carboxyl groups and a glycol selected from the class consisting of di-, tri-, and polyethylene glycols, with toluene di-isocyanate, a small amount of water and a tertiary amine catalyst. Carbon dioxide gas, liberated by the reaction, produces an expanded mass which cures to a soft, flexible foam of considerable toughness and strength. This material has many uses in the furniture and cushioning fields and it can also be used as acoustic and heat insulation, light weight molded articles, etc. It is similar to but generally superior to foam rubber for many uses. It withstands heat, sunlight, most solvents, oxygen and various chemicals much better than foam rubber.

In order to obtain foamed polyester resinous materials of maximum strength, the molecular weight of the liquid resin which is used in the foam reaction should be as high as possible. It is also desirable to use very high molecular weight resins in the foam reaction for another reason. For most uses the foamed product should have relatively small pores since this results in a more stable foam and also a product having lower specific gravity. A product having small pores is best produced from a liquid polyester resin having a high viscosity. Although pore size can be controlled to some extent by using foam stabilizing agents, foam stability is most largely dependent upon the viscosity of the reaction mixture being foamed. Viscosity of the polyester resin is directly related to its molecular weight and high viscosity material can only be obtained when the molecular weight of the resin is relatively high. Molecular weights of optimum magnitude with desired hydroxyl numbers are difficult to obtain using the methods of making polyester resins which are mentioned in the aforementioned co-pending application of Wilson and Shuffman.

One object of the present invention is to provide an improved method of making foamed polyester resin materials.

Another object of the invention is to provide an improved method of making a stable polyester foam.

Another object of the invention is to provide an improved method of making a polyester foam material having relatively small pores.

Another object of the invention is to provide an improved method of making a low specific gravity polyester foam material.

A co-pending application of Christopher L. Wilson and Henry George Hammon, Serial No. 442,195, filed July 8, 1954, described and claims an improved method of making a polyester resin in the form of a viscous liquid of high molecular weight. Briefly, the method comprises mixing together a saturated straight chain dibasic acid having 2 to 8 carbon atoms and 0 to 2 non-adjacent ether oxygen atoms in the chain between the carboxyl groups, a glycol selected from the group consisting of di-, tri- and polyethylene glycols, said di-, tri- and polyethylene glycols being referred to elsewhere herein by the single term "polyethylene glycol," and an alkyl polyhydroxy compound containing more than 2 hydroxyl groups and heating until the evolved water is driven off. The liquid resin thus formed preferably has the sum of its acid and hydroxyl numbers between about 30 and about 140 and it has a relative viscosity between about 0.05 and 0.36. More preferably, the sum of the acid and hydroxyl numbers is between 40 and 100, and the relative viscosity (determined as described in the Wilson and Hammon co-pending application) is between 0.09 and 0.20. The acid numbers of the resins of the examples of the practice of this invention appearing hereinbelow range from 1 to 25.

It has now been found that improved polyester resin foamed materials can be made from any of the resins described in the above mentioned application of Wilson and Hammon. A feature of the present invention is a process of making an improved polyester resin foamed material comprising mixing together one of the polyester resins referred to immediately above, technical grade toluene di-isocyanate, which is a mixture of the -2,4 and the -2,6 isomers, a tertiary amine catalyst and a small amount of water. Fillers and pigments may also be included in the reaction mixture if desired. Liberation of carbon dioxide gas causes almost immediate foaming and a product is formed which is a soft, resilient, light-weight, expanded material. The curing reaction is mostly complete in about an hour and the material is ready for cutting after about 24 hours. The reaction proceeds without external application of heat.

Example 1

To thirty grams of a polyester resin made from adipic acid, 73 g., diethylene glycol, 49 g., and glycerol, 5 g., which had an acid number of 25 and a hydroxyl number of 60, was added 7.5 cc. of technical grade toluene di-isocyanate, 1 g. of the phenyl urethane of hydroxyethyl-morpholine, and 0.5 cc. of water. The mixture was stirred with a mechanical mixer for twenty seconds and allowed to foam. After twenty-four hours, the product was a resilient, flexible foam with small interconnected pores. In the polyester of this example the hydroxyls supplied by the glycerol were 15% of the total hydroxyl groups provided by the diethylene glycol and the glycerol. In the succeeding examples the corresponding percentage is referred to more briefly merely as the percentage of the total hydroxyl groups.

Example 2

To thirty grams of a polyester resin made from dimethyl adipate, 174 g., diethylene glycol, 108 g., and glycerol, 3 g., providing 4.6% of the total hydroxyl groups, which had an acid number of 0.9, a hydroxyl number of 54, and a viscosity of 0.075, was added 7.5 cc. of technical grade toluene di-isocyanate, 1.5 g. of the tris phenyl urethane of triethanolamine, 1 g. of oleic acid, and 0.5 cc. of water. The mixture was stirred with a mechanical stirrer for twenty seconds, and allowed to foam. After twenty-four hours, the product was a resilient, flexible foam with medium interconnected pores.

*Example 3*

To thirty grams of a polyester resin made from adipic acid, 146 g., triethylene glycol, 157 g., and pentaerythritol, 7 g. providing 9.1% of the total hydroxyl groups, which has an acid number of 12, a hydroxyl number of 57, and a viscosity of 0.115, was added 7.5 cc. of technical grade toluene di-isocyanate, 0.75 cc. of bis diethylethanolamine adipate, and 0.5 cc. water. The mixture was stirred with a mechanical mixer for twenty seconds and allowed to foam. After twenty-four hours, the product was a resilient, flexible foam with medium pores.

*Example 4*

To thirty g. of a polyester resin made from diglycolic acid, 134 g., triethylene glycol, 157 g., and pentaerythritol, 7 g. providing 9.1% of the total hydroxyl groups, which had an acid number of 9 and a viscosity of 0.083, was added 7.5 cc. of technical grade toluene di-isocyanate, 1 g. of the p-tolyl urethane of hydroxyethylmorpholine, and 0.5 cc. water. The mixture was stirred with a mechanical mixer for twenty seconds and allowed to foam. After twenty-four hours, the product was a resilient, flexible foam with both large and small pores.

*Example 5*

30 g. of a polyester resin made by reacting 146 grams of adipic acid, 104 g. diethylene glycol, 16.5 g. of pentaerythritol providing 19.8% of the total hydroxyl groups, having an acid number of 19 and a hydroxyl number of 57, with a viscosity of 0.164, was mixed rapidly with 7.55 cc. of technical grade toluene di-isocyanate, 0.5 cc. of water, and 0.85 g. of 2,6-lutidine for 20 seconds and allowed to foam. The resulting product, after curing, is a flexible foam, with partially closed holes and mostly interconnected holes whose final volume is 5 times the original volume.

*Example 6*

To thirty grams of a polyester resin made from sebacic acid, 202 parts by weight, triethylene glycol, 157 parts by weight, and pentaerythritol, 7 parts by weight providing 9.1% of the total hydroxyl groups, which had an acid number of 13.9, a hydroxyl number of 44, and a viscosity of 0.118 was added 7.5 cc. of technical grade toluene di-isocyanate, 0.8 cc. of 2-cyanoethyl 2-diethylaminoethyl ether, and 0.5 cc. of water. The mixture was stirred for twenty seconds with a mechanical mixer and allowed to foam. After twenty-four hours, the product was a resilient, flexible foam with large interconnected pores.

*Example 7*

To thirty grams of a polyester resin made from glutaric acid, 132 parts by weight, diethylene glycol, 115 parts by weight, and pentaerythritol, 7 parts by weight providing 8.8% of the total hydroxyl groups, which had an acid number of 14.7, and a hydroxyl number of 70, was added 7.5 cc. of technical grade toluene di-isocyanate, 0.05 cc. triethylamine, and 0.5 cc. water. The mixture was stirred for twenty seconds with a mechanical mixer and allowed to foam. After twenty-four hours, the product was a resilient, flexible foam with large interconnected pores.

*Example 8*

To 30 g. of a polyester resin made from succinic anhydride, 100 parts by weight, triethylene glycol, 157 parts by weight and triethanolamine, 7 parts by weight providing 6.3% of the total hydroxyl groups, which had an acid number of 20.1, a hydroxyl number of 47, and a viscosity of 0.068, was added 7.5 cc. of technical grade toluene di-isocyanate, 0.75 cc. of 2-morpholinylethyl 2-cyanoethyl ether, and 0.5 cc. of water. The mixture was stirred rapidly for twenty seconds with a mechanical mixer and allowed to foam. After twenty-four hours, the product was a resilient, flexible foam with both large and small interconnected pores.

*Example 9*

To thirty grams of a polyester resin made from adipic acid, 146 parts by weight, diethylene glycol, 115 parts by weight, and triol 230, 10 parts by weight providing 6.4% of the total hydroxyl groups [Triol 230 is the trade name for a polyol with the formula $HOCH_2CH_2OCH_2C(CH_3)$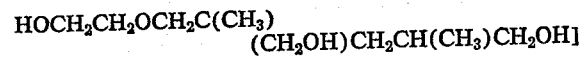
$(CH_2OH)CH_2CH(CH_3)CH_2OH$]

which had an acid number of 15, a hydroxyl number of 48, and a viscosity of 0.086 was added 7.5 cc. of technical grade toluene di-isocyanate, 1 cc. of 2-diethylaminoethyl acetate, 0.5 cc. of diethylamine oleate, and 0.5 cc. of water. The mixture was stirred rapidly for twenty seconds with a mechanical mixer and allowed to foam. After twenty-four hours, the product was a resilient, flexible foam with medium pores.

*Example 10*

To thirty grams of a polyester resin made from succinic anhydride, 100 parts by weight, diethylene glycol, 115 parts by weight, and pentaerythritol, 7 parts by weight providing 8.8% of the total hydroxyl groups, which had an acid number of 13, a hydroxyl number of 69, and a viscosity of 0.081 was added 7.5 cc. of technical grade toluene di-isocyanate, one cc. of 2-(2-morpholinylethoxy) tetrahydropyran, 0.5 cc. of a 50% solution of sodium ricinoleate, and 0.25 cc. of water. The mixture was stirred rapidly for twenty seconds with a mechanical mixer and allowed to foam. After twenty-four hours, the product was a resilient, flexible foam with large interconnected pores.

*Example 11*

To thirty grams of a polyester resin made from azelaic acid, 97 grams, polyethylene glycol 400, 210 g., and pentaerythritol, 10 g. providing 21.9% of the total hydroxyl groups, which had an acid number of 13.7, a hydroxyl number of 59, and a viscosity of 0.096, was added 7.5 cc. of technical grade toluene di-isocyanate, 1 gram of the bis diethylaminoethyl urethane of 2,4-toluene di-isocyanate, 0.5 cc. of a 50% solution in water of potassium ricinoleate, and 0.25 cc. of water. The mixture was stirred rapidly for twenty seconds with a mechanical mixer and allowed to foam. After twenty-four hours, the product was a resilient, flexible foam with both large and small interconnected pores.

*Example 12*

To 30 g. of a polyester made from 89 g. ethylene bis (glycolic acid), 57 g. of diethyleneglycol and 4 g. trimethylolethane providing 8.5% of the total hydroxyl groups which had an acid number of 21 and a viscosity of 0.076 was added 7.5 cc. of technical grade toluene di-isocyanate, 0.75 cc. of bis diethylethanolamine adipate and 0.5 cc. of water. The mixture was stirred with a spatula until thoroughly mixed and allowed to foam. After two days the product was a flexible foam.

As previously mentioned, the polyester resins which may be used in making the improved materials of the present invention are any of those described in the above referred to application of Wilson and Hammon. The preferred alkyl polyhydroxy compounds used in making these resins are compounds such as glycerol, pentaerythritol, dipentaerythritol, sorbitol, trimethylolethane and trimethylolpropane. A triol known commercially as "Triol 230" can also be used. These polyhydroxy compounds are characterized by hydroxyl groups on side chains. This factor causes the resins which are formed to have a higher viscosity for a given molecular weight than resins which are made without utilizing this type of polyhydroxy compound. Because the polyester resin used in the foaming reaction has a relatively high viscosity, the foam stability is greatly increased during the foaming process. The presence of the side chains on one of the types of compounds used in making the resin also promotes a reaction in which the di-isocyanate used in the foaming reaction links neighboring chains of molecules together. When this cross-linking is properly controlled, the foamed product possesses enhanced resilient properties, strength and rubbery character. In the polyester foamed products made as described in the previously mentioned Wilson and Shuffman application, the introduction of rubbery properties results from physical forces between the molecular chains rather than from chemical bonds.

The presence of the alkyl polyhydroxy compounds in the reaction mixtures used in making the improved foamed products of the present invention also results in a further advantage. The larger number of hydroxyl groups causes the reaction to be more complete and the curing to a film, non-tacky product to take place much more rapidly. The product may become non-tacky in only two or three minutes.

Hard or resilient products can be made depending upon the proportion of polyhydroxy compound to the rest of the ingredients of the resin. If a foamed product is desired having optimum flexibility and strength which is consistent with low specific gravity, it is necessary to use a proportion of polyhydroxy compound to glycol which is below a certain maximum which depends upon the particular polyhydroxy compound which is being used. It has also been determined that the amount of the polyhydroxy compound is preferably between about 1% and 5% of the total weight of the reactants. In the foregoing examples the hydroxyl groups provided by the polyhydroxy compound ranged from 4.6% to 21.9% of the total hydroxyl groups provided by the polyethylene glycol and the polyhydroxy compound.

Technical grade toluene di-isocyanate is preferred in the improved process of the present invention. The technical grade material is a mixture of the -2,4 and the -2,6 isomers in varying amounts. It is preferred that the proportion of the -2,6 isomer be greater than 10% and more preferably between 20 and 40%. The polyester resin and the di-isocyanate can be used in the proportion of about 30 g. resin to 5-9 cc. (6-11 g.) di-isocyanate.

Any tertiary amine can be used as a catalyst in making the foamed products of the invention. Typical examples of these amines are pyridine, collidine, lutidine, methyl morpholine, triethylamine, and 2-diethylaminoethylacetate. There may also be used salts made by reacting these amines with long chain fatty acids, for example, oleic and ricinoleic acids, as well as esters other than acetates of hydroxyamines, such as 2-diethylaminoethanol. Reaction products of these hydroxy-tertiary amines with isocyanates may also be employed. These are known as urethanes.

The strength and amount of tertiary amine used determines the speed of the reaction between resin and isocyanate. The reaction rate may be varied almost as desired merely by choosing amines of different strengths. The specific amount of amine catalyst to be used in a specific instance varies so much with the amine which is selected as well as with the other components used that no general rule as to specific amounts can be given. In general, sufficient catalyst should be used to cause the reaction to be at least about 80% complete in about 30 minutes and substantially complete in about 24 hours. It is believed, however, that the reaction continues very slowly for some time even after the product is cured and ready for use. It is substantially complete for all practical purposes, however, after about 24 hours is performed according to the examples.

Foam stabilizers can either be used or omitted entirely. They aid in producing a foamed product having more uniform and smaller bubble size. The amount of stabilizer used depends upon the degree of coarseness, i.e., size of cells or bubbles, desired in the final product. The maximum useful amount which has been found desirable is about 5% by weight of the entire composition. Any amount up to this proportion can be used. Higher proportions do not produce any important improvement.

The size of the bubbles can also be varied by the use of different foam stabilizers. Some of the materials used as catalysts of the foam reaction also act as foam stabilizers. Examples of foam stabilizers which have been found to be particularly effective are: reaction products of amines such as diethylamine, triethylamine, $$C_6H_5NHCO_2CH_2CH_2N(CH_2CH_3)_2$$

or $$CH_3C_6H_3[NHCO_2CH_2CH_2N(CH_2CH_3)_2]_2$$

with a long chain fatty acid such as oleic acid or ricinoleic acid, non-ionic wetting agents such as $$CH_3(CH_2)_7C_6H_4O(CH_2CH_2O)_{15}H$$

(Igepal CA-630). Salts of ricinoleic acid containing inorganic radicals, which disperse in the reaction mixture may also be used. Tertiary amine compounds may serve both as catalysts and foam stabilizers in the reaction depending upon the relative amounts of amine and fatty acid.

In the foaming reaction, the water reacts with diisocyanate to produce carbon dioxide gas. Just enough water is used to liberate enough gas to produce a foam of desired density. The larger the amount of water used, the lower the density of foam produced.

What is claimed is:

1. A process for making a resilient, foamed, polyester resinous material comprising mixing together (1) a liquid polyester resin made substantially entirely by the reaction of an acid selected from the group consisting of straight chain saturated aliphatic dicarboxylic acids containing 2 to 8 carbon atoms between the carboxyl groups and saturated aliphatic dicarboxylic acids containing 2 to 8 carbon atoms and up to 2 non-adjacent ether oxygen atoms between the carboxy groups, a polyethylene glycol and an aliphatic polyhydroxy compound containing from 3 to 6 hydroxyl groups, the acid number of said resin being from about 1 to about 25, the sum of the acid and hydroxyl numbers of said resin being from about 40 to about 100 and the hydroxyl groups provided by said aliphatic polyhydroxy compound constituting from about 4.6% to about 21.9% of the total hydroxyl groups provided by said glycol and by said polyhydroxy compound, (2) a mixture of -2,4 and -2,6 toluene diisocyanates wherein the proportion of the -2,6 isomer ranges from about 10% to about 40% of said mixture, (3) a tertiary amine catalyst, and (4) a small amount of water, said mixture of said diisocyanates being substantially in excess of that reactive with the carboxyl and hydroxyl groups of said resin, and said water reacting with said diisocyanates to produce carbon dioxide gas for production of a foam.

2. A process according to claim 1 wherein the amount of -2,6 toluene diisocyanate comprised in said toluene diisocyanate is at least about 20% of said toluene diisocyanate and the relative viscosity of said resin is between about 0.05 and about 0.36.

3. A process according to claim 1 wherein said amine is tris phenyl urethane of triethanol amine.

4. A process according to claim 1 wherein the reaction mixture includes a foam stabilizer comprising up to about 5% by weight of the entire reaction mixture of a reaction product of an amine and a long chain fatty acid.

5. A process according to claim 1 wherein the raction mixture includes a foam stabilizer comprising up to about 5% by weight of the entire reaction mixture of a non-ionic wetting agent.

6. A process according to claim 5 wherein said non-ionic wetting agent is the compound represented by the formula $CH_3(CH_2)_7C_6H_4O(CH_2CH_2O)_{15}H$.

7. A resilient foamed, polyester resinous material made by the process of claim 1.

References Cited in the file of this patent

UNITED STATES PATENTS

| | | |
|---|---|---|
| 2,577,279 | Simon et al. | Dec. 4, 1951 |
| 2,602,783 | Simon et al. | July 8, 1952 |
| 2,611,756 | Pockel | Sept. 23, 1952 |
| 2,650,212 | Windemuth | Aug. 25, 1953 |

FOREIGN PATENTS

| | | |
|---|---|---|
| 659,344 | Great Britain | Oct. 24, 1951 |
| 516,512 | Belgium | Jan. 15, 1953 |

OTHER REFERENCES

Monsanto Tech. Bull., No. P–144, February 1, 1953, pages 1 to 5 inclusive.